(12) United States Patent
Brunone

(10) Patent No.: US 11,440,737 B2
(45) Date of Patent: Sep. 13, 2022

(54) SUPPORT STATION, BELT CONVEYOR AND METHOD OF MANUFACTURING SUCH A SUPPORT STATION

(71) Applicant: René Brunone, Saint-Marcel (FR)

(72) Inventor: René Brunone, Saint-Marcel (FR)

(*) Notice: Subject to any disclaimer, the term of this patent is extended or adjusted under 35 U.S.C. 154(b) by 0 days.

(21) Appl. No.: 17/305,029

(22) Filed: Jun. 29, 2021

(65) Prior Publication Data

US 2021/0403243 A1 Dec. 30, 2021

(30) Foreign Application Priority Data

Jun. 30, 2020 (FR) .................................. 20 06847

(51) Int. Cl.
| | |
|---|---|
| B65G 39/12 | (2006.01) |
| B65G 15/62 | (2006.01) |
| B65G 21/20 | (2006.01) |
| B65G 15/60 | (2006.01) |
| B65G 39/16 | (2006.01) |

(52) U.S. Cl.
CPC ............. B65G 21/20 (2013.01); B65G 15/60 (2013.01); B65G 39/16 (2013.01); B65G 2207/40 (2013.01); B65G 2812/02108 (2013.01)

(58) Field of Classification Search
CPC ....... B65G 15/62; B65G 21/20; B65G 39/125
USPC ................................................ 198/824–826
See application file for complete search history.

(56) References Cited

U.S. PATENT DOCUMENTS

| | | | | |
|---|---|---|---|---|
| 736,905 | A * | 8/1903 | Willson, Jr. | |
| 3,038,588 | A * | 6/1962 | Arndt | B65G 39/145 |
| | | | | D34/29 |
| 3,593,841 | A * | 7/1971 | Leow | B65G 39/16 |
| | | | | 226/23 |
| 6,634,490 | B2 * | 10/2003 | Fischer | B65G 21/2054 |
| | | | | 198/825 |
| 8,376,127 | B2 * | 2/2013 | Sharp | B65G 39/16 |
| | | | | 198/806 |
| 8,985,317 | B2 * | 3/2015 | Martin | B65G 39/125 |
| | | | | 198/828 |
| 9,714,141 | B2 * | 7/2017 | Felton | B65G 15/08 |
| 9,856,088 | B1 * | 1/2018 | Riggs | B65G 39/16 |
| 10,377,571 | B2 * | 8/2019 | Grimm | B65G 13/11 |
| 10,486,912 | B2 * | 11/2019 | Sharp | B65G 39/16 |

FOREIGN PATENT DOCUMENTS

| | | |
|---|---|---|
| AU | 2005203738 A1 | 3/2006 |
| FR | 2750966 A1 | 1/1998 |
| FR | 2782988 A1 | 3/2000 |

(Continued)

OTHER PUBLICATIONS

French Search Report for French Patent Application No. FR2006847, dated May 18, 2021 in 2 pages.

*Primary Examiner* — Douglas A Hess
(74) *Attorney, Agent, or Firm* — Knobbe, Martens, Olson & Bear, LLP

(57) ABSTRACT

A support station includes a frame, at least two support rollers separated transversely by a gap, and a nip angle protector, which includes, for the or each gap, a gap protector placed longitudinally opposite the gap on an upstream side of the gap. The support station can be manufactured by obtaining a profile with a continuous upper edge and a continuous lower part along its entire length, and cutting the space and the slots, by T-punching the profile.

7 Claims, 4 Drawing Sheets

(56) References Cited

FOREIGN PATENT DOCUMENTS

| | | | |
|---|---|---|---|
| FR | 2798916 | A1 | 3/2001 |
| FR | 2900139 | A1 | 10/2007 |
| FR | 2946034 | A1 | 12/2010 |

* cited by examiner

SUPPORT STATION, BELT CONVEYOR AND METHOD OF MANUFACTURING SUCH A SUPPORT STATION

The present invention relates to belt conveyor safety in general.

A belt conveyor may comprise a plurality of support stations distributed along the belt path. Each support station comprises a frame and one or more rollers rotatably mounted on the frame and supporting the conveyor belt.

Nip angles are formed between each support roller and the conveyor belt when the conveyor belt rests on the rollers. These nip angles are extremely dangerous, as both the belt and the roller are in motion. An operator's hand can be caught in the nip angle and crushed between the belt and the roller.

It is possible to place guards at each roller to prevent access to the nip angle.

However, such guards are not entirely satisfactory, and a small risk of accidents remains.

In this context, the invention aims to provide a support station for a conveyor belt, with reinforced protection at the nip angles.

To this end, according to a first aspect, the invention relates to a support station of a belt conveyor, the support station comprising:
- a frame;
- at least two support rollers adapted to support a conveyor belt running longitudinally from an upstream side of the support rollers to a downstream side of the support rollers, the at least two support rollers rotatably mounted on the frame about respective axes of rotation substantially perpendicular to the longitudinal direction and transversely separated by a gap, nip angles being formed between the at least two support rollers and the conveyor belt when the conveyor belt is resting on the at least two support rollers;
  - a nip angle protector, comprising a roller guard for each support roller, longitudinally facing said support roller on an upstream side of said support roller, and, for the or each gap, a nip guard longitudinally facing said gap on an upstream side of said gap.

Thus, the gaps between the rolls are not left unprotected. Instead, a guard is placed longitudinally opposite said gap, so that operators can no longer access the nip angles through the gaps.

This increased protection reduces the risk of accidents.

The support station may further represent one or more of the following features, considered individually or in any technically possible combination:
- the roller guards and the or each gap guard are made of a material having an elastic modulus of between 50 and 400 MPa;
- the roller guards and the or each gap guard are integral with each other in a single part;
- said single part comprises a continuous upper edge, intended to be placed immediately under the conveyor belt and extending transversely along each support roller and the or each gap;
- for each roller guard, said single part comprises a lower portion integral with the continuous upper edge and extending the continuous upper edge downwards, the or each gap guard comprising only the continuous upper edge;
- the lower parts of two adjacent roller guards are separated by a space, said two roller guards each comprising a slot separating the continuous upper edge from the lower part and opening into the space;
- the frame comprises at least one fastening bar, at least one of the lower parts comprising a groove attached by a form of interaction to the at least one fastening bar;
- the at least two support rollers have axes of rotation that are inclined with respect to each other, the corresponding roller guards being inclined with respect to each other, the gap cover forming a hinge between the roller guards.

According to a second aspect, the invention relates to a belt conveyor comprising a conveyor belt and a plurality of support stations for said belt having the above features, distributed along said belt.

According to a third aspect, the invention relates to a method of manufacturing a support station having the above features, comprising the following steps:
- obtaining a profile with a continuous upper edge and a continuous lower part along its entire length;
- cutting out the space and the slots by T-punching the profile.

Further features and advantages of the invention will be apparent from the detailed description given below, by way of indication and not in any way limiting, with reference to the attached figures, among which:

Figure 1:
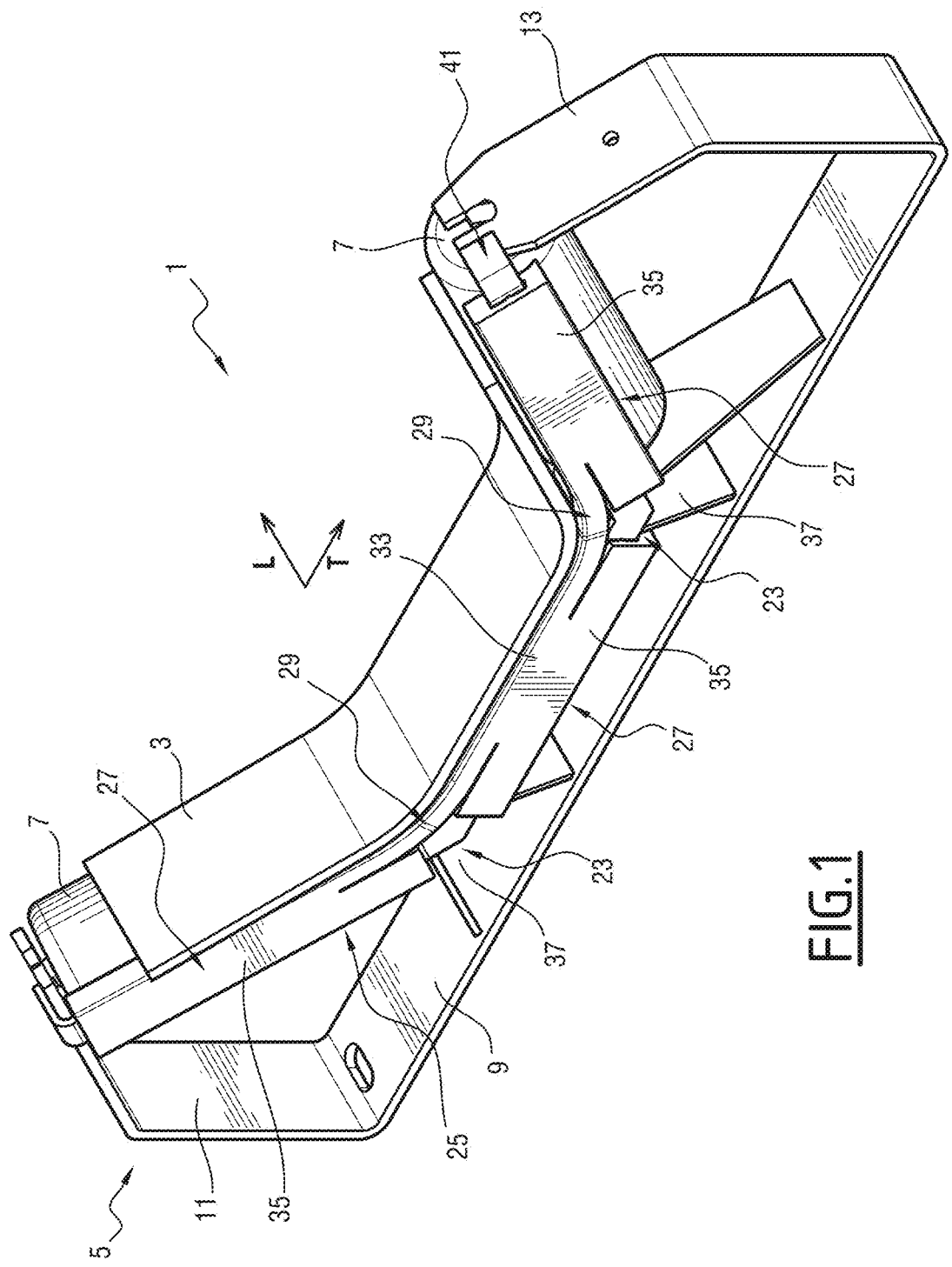
FIG. 1 is a perspective view of a support station according to the invention, only a section of the conveyor belt resting on the support station being shown.
Figure 2:
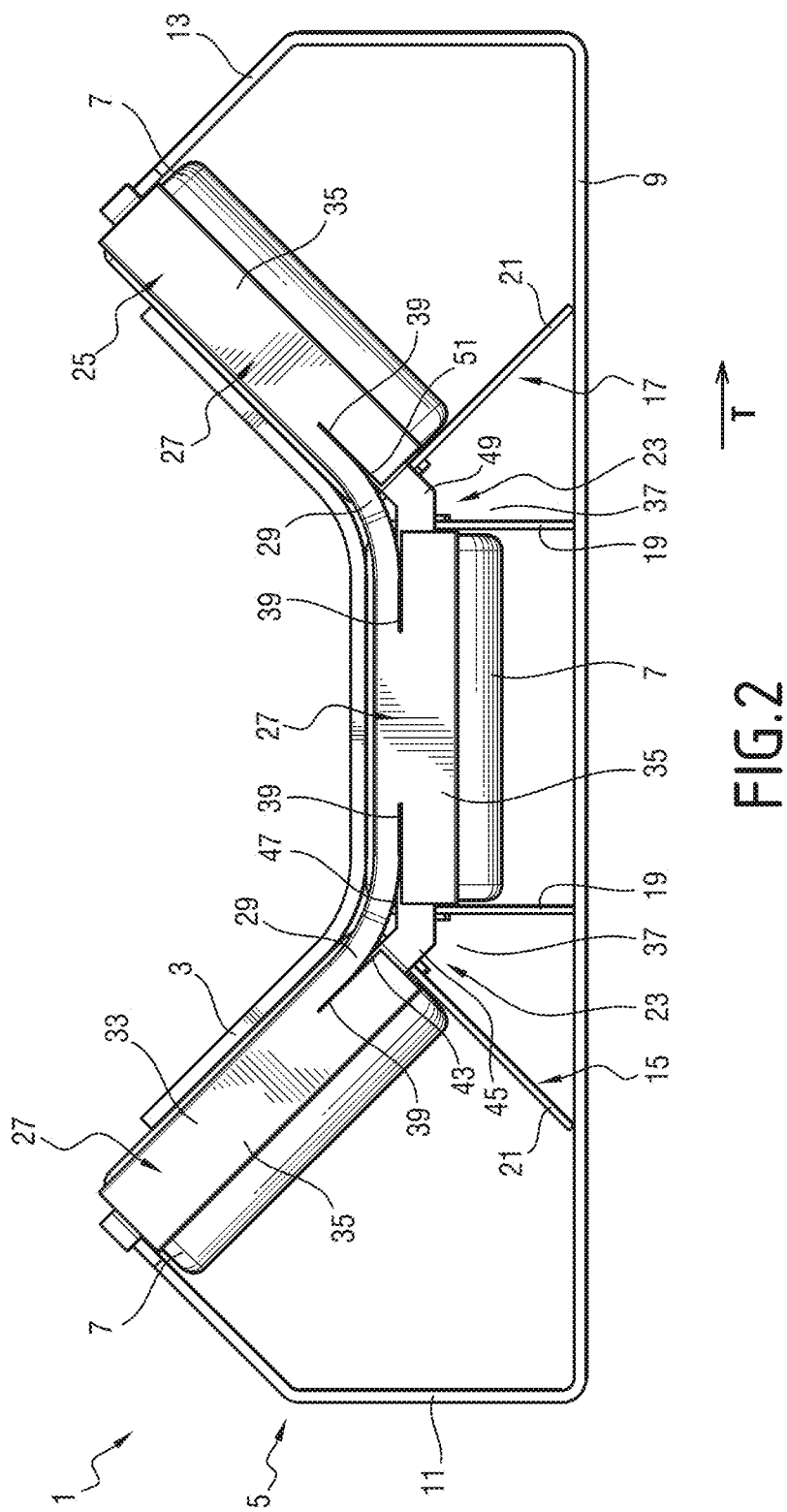
FIG. 2 is a front view of the support station of FIG. 1.

The support station 1 shown in FIGS. 1 and 2 is intended to be integrated into a belt conveyor.

This conveyor is typically intended for transporting broken up materials, such as sand or ores from a quarry.

This belt conveyor typically comprises a longitudinal conveyor belt 3 and a plurality of said support stations 1, intended to support the conveyor belt 3. These support stations 1 are distributed along the belt.

Typically, the conveyor belt 3 is looped and engaged at its ends around turnaround rollers (not shown).

Typically, one of the two reversing rollers is driven to ensure the belt is driven.

In FIGS. 1 and 2, only a short longitudinal section of the belt 3 is shown, to reveal the structure of the support station.

The support station 1 comprises a frame 5, and at least two support rollers 7 provided to support the conveyor belt 3.

The conveyor belt 3 rests on the support rollers 7, and runs longitudinally from an upstream side of the rollers 7 to a downstream side of the rollers 7.

The longitudinal direction L, in which the conveyor belt 3 runs, is marked by an arrow in FIG. 1.

The rollers 7 are mounted on the frame 5 around respective axes of rotation, which are not visible in the Figures. These axes of rotation are substantially perpendicular to the longitudinal direction.

In the example shown in the Figures, the support station 1 has 3 support rollers 7, a central roller and two lateral rollers placed on either side of the central roller along a transverse direction T shown in FIG. 2.

The transverse direction is horizontal and substantially perpendicular to the longitudinal direction.

The axis of rotation of the central roller 7 is substantially transverse.

The axes of rotation of the side rollers 7 are inclined, the inclinations being such that the three support rollers 7 have the shape of a trough.

In the example shown, the frame 3 comprises a base 9 intended to rest on a support, and two side uprights 11 and 13. It also comprises two "V" shaped bent irons 15 and 17, fixed to the base 9. The central roller 7 is rotatably mounted between the two irons 15 and 17. The side rollers 7 are mounted one between the side upright 11 and the iron 15, and the other between the side upright 13 and the iron 17.

Specifically, each iron 15, 17 comprises a side leg 19 and a center leg 21 forming an upwardly pointing "V". Each side roller 7 is mounted between the side arm 21 of one of the irons 15, 17 and one of the side uprights 11, 13. The center roller is mounted between the center arms 19 of the two "V" irons 15, 17.

In a variant, the frame 3 has any other suitable shape.

In a variant, the support station 1 comprises only two rollers 7 or comprises more than three rollers 7.

The axes of rotation of these rollers may form non-zero angles to each other, or conversely the axes of rotation may be transversely aligned.

In any case, the rollers 7 are transversely separated from each other by gaps 23.

This gap 23 is delimited by the circular end surfaces of the rollers 7.

In the example shown, it has a general "V" shape, as the axes of rotation of the rollers are inclined with respect to each other.

In the example shown in FIGS. 1 and 2, the gap 23 corresponds substantially to the space defined between the central branch 19 and the lateral branch 21 of each "V" iron.

Nip angles are formed between the support rollers 7 and the conveyor belt 3 when the conveyor belt 3 rests on the support rollers 7. Each nip angle is bounded on one side by the underside of the conveyor belt 3, and on another side by the roller 7.

The support station 1 also comprises a nip angle protector 25.

The nip angle protector 25 is placed on the upstream side of the rollers 7.

For each roller, the nip angle protector 25 comprises a roller guard 27 placed longitudinally opposite said roller 7 on an upstream side of the roller 7.

According to the invention, the nip angle protector 25 further comprises a gap protector 29 for the or each gap 23, placed longitudinally opposite said gap 23 on an upstream side of said gap 23.

Each roller guard 27 extends parallel to the axis of rotation of said roller 7, along the entire length of said roller 7. The roller guard 27 thus has substantially the same axial length as the roller 7.

It is placed immediately under the conveyor belt 3, so as to mask the nip angle.

Similarly, each gap protector 29 extends across the entire width of the gap 23, i.e. from one of the rollers 7 flanking the gap 23 to the other roller 7. Specifically, it extends from the roller guard 27 protecting the roller 7 on one side of the nip to the roller guard 27 of the roller located on the other side of the gap 23. The gap protector 29 is placed immediately below the conveyor belt 3, so as to prevent access to the nip angles through the corresponding gap 23.

Figure 3:
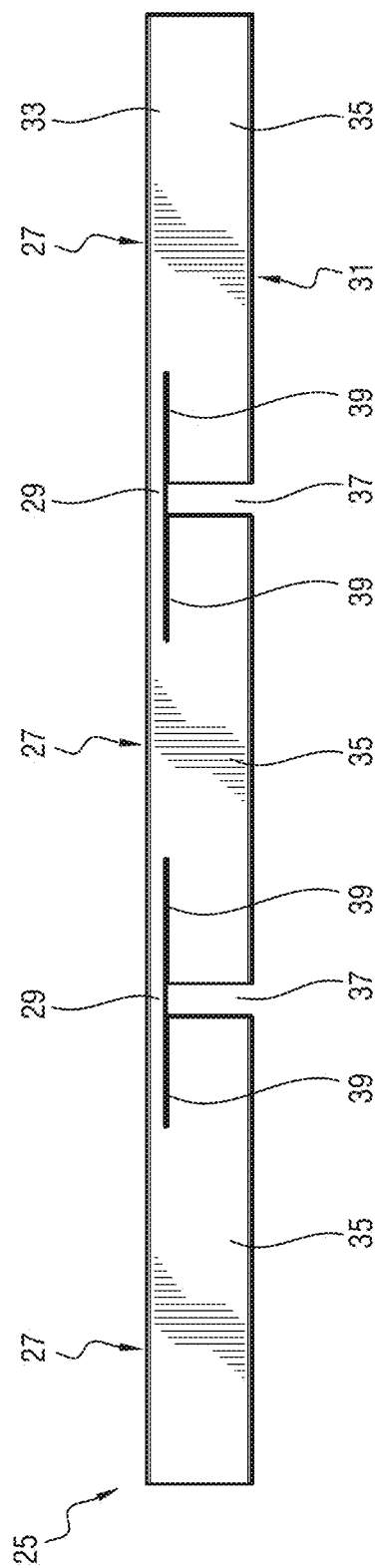
FIG. 3 is a front view of the retractable corner protection fitted to the support station of FIGS. 1 and 2, in the unfolded state.
Figure 4:
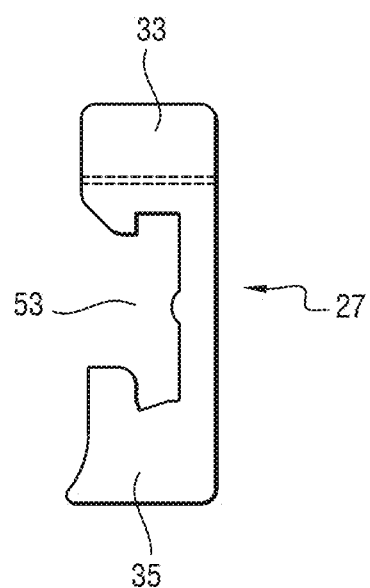
FIG. 4 is a side view of the nip angle protection of FIG. 3.

Advantageously, the roller guards 27 and the gap protector(s) 29 are integral with each other in a single part 31. In other words, they are made up of a single continuous part. This part is shown in FIGS. 3 and 4.

Advantageously, the roller guards 27 and the gap protector(s) 29 are made of a material selected from the following list: a plastic material, in particular polyethylene, a metal, a wood, a composite etc.

As visible in FIG. 3, said single part 31, comprises a continuous upper edge 33, intended to be placed immediately below the conveyor belt 3.

The continuous upper edge 33 extends transversely along each roller 7 and the or each gap 23.

In other words, the continuous upper edge 33 extends along the entire axial length of each roller 7, and along the entire width of each gap 23.

The continuous upper edge 33 substantially follows the shape of the bottom surface of the belt 3 at the rolls 7, as explained below.

In other words, the rollers 7 together define a support surface for the belt 3, which is trough-shaped in the example shown. The continuous upper edge 33 has substantially the same shape. The top of the continuous upper edge 33 arrives slightly below the bottom surface of the belt 3. A limited spacing of a few millimeters, typically between 1 and 10 mm, advantageously between 2 and 5 mm, ensures that there is no friction between the conveyor belt 3 and the continuous upper edge 33 of the nip angle protector 25.

For each roller guard 27, the single part 31 comprises a lower portion 35 integral with the continuous upper edge 33, and extending the continuous upper edge 33 downwards.

The distance between the belt 3 and the nip angle protector 25, and the distance between the nip angle protector 25 and the roller 7 are chosen to be small enough to prevent a person from passing a finger between the web and the protector or between the protector and the roller. These distances are a few millimeters.

In the example shown, the continuous upper edge 33 has a height, taken perpendicularly to the axis of rotation of the rolls, of between 10% and 30% of the diameter of the roll.

In the example shown, the lower portion 35 has a height of between 20% and 100% of the roller diameter.

For other applications, the height of the upper edge and the height of the bottom portion may not be within the above ranges.

The section of the continuous upper edge 33 belonging to the guard 27 of a roller 7 extends substantially parallel to the axis of rotation of that roll.

The or each gap protector 29 comprises only the continuous upper edge 33.

Thus, the lower portions 35 of two adjacent roller guards 27 are separated by a space 37.

As visible in FIGS. 2 and 3, the roller guards 27 flanking the space 37 each comprise a slot 39 separating the upper edge 33 from the lower portion 35.

These two slots 39 each open at one end into the space 37. Each slot 39 is closed at its end opposite the space 37.

In the example shown, the slots 39 are substantially parallel to the axes of the rollers 7

In a variant, the slots form an angle with respect to the axes of the rollers 7.

Each slot 39 extends over a length, taken parallel to the axis of rotation of the roller 7, of between 10% and 30% of the length of the roller guard 27.

In addition, the frame 5 comprises at least one fastening bar 41, to enable fastening the nip angle protector 25.

This fastening bar 41 is typically a flat iron.

In the example shown, the fastening bar 41 extends continuously from the upright 11 to the upright 13.

More specifically, it comprises a straight portion 43 extending from the upright 11 to the side leg 21 of the "V"

iron 15, extended by a "V" portion 45 extending between the side leg 21 and the center leg 19 of the "V" iron 15, extended by a second straight portion 47 extending between the center legs 19 of the two "V" irons 15, 17, extended by another V-shaped portion 49 extending between the central branch 19 and the lateral branch 21 of the V-shaped iron 17, and further extended by a third straight portion 51 extending between the lateral branch 21 of the V-shaped iron 17 and the side upright 13.

In a variant, the fastening bar 41 comprises only the straight portions 43, 47 and 51, and does not comprise the "V" portions 45 and 49.

As shown in FIG. 4, at least one of the lower portions 35 comprises a groove 53 attached by a form of interaction to the fastening bar 41.

Preferably, each of the lower portions 35 comprises said groove 53.

This makes attaching the nip angle protector 25 to the frame 5 very simple. It is sufficient to clip the lower portions 35 onto the fastening bar 41.

It is particularly advantageous if the rollers have axes of rotation that are inclined to each other.

The axes of rotation may form an angle with each other that lies in a vertical plane, as shown in FIGS. 1 and 2, and/or form an angle with each other that lies in a horizontal plane.

In the second case, the outer rollers form an angle with the center roller in the horizontal plane, typically referred to as the nip angle. In other words, the axes of the outer rolls are no longer perpendicular to the longitudinal direction.

In fact, the roller guards 27 are then tilted relative to each other.

In this case, the or each gap protector 29 forms a hinge between the two roller guards 27 that flank it, as illustrated in FIGS. 1 and 2.

This is achieved in a particularly simple manner, primarily due to the existence of a space 37 between the lower portions 35 of the adjacent roller guards 27. The lower portions 35 of the adjacent roller guards 27 are completely free of each other. Furthermore, the slots 39, as clearly visible in FIG. 2, allow the continuous upper edge 33 to adopt an arcuate shape at the gaps.

The choice of material used to make the gap protector 29 also contributes to this result. The material is flexible enough to deform without damaging the part. Typically, the material has a modulus of elasticity of between 50 and 400 MPa, preferably between 150 and 250 MPa, and being for example 190 MPa.

The radius of curvature can be easily adjusted, including adjusting the length and width of the slots 39, as well as the cross-section of the continuous upper edge 33.

The radius of curvature is adjusted to match the radius of curvature of the empty belt at the gap.

In other words, the curvature of the or each gap protector 29 is as close as possible to the shape of the belt when unloaded. The empty belt is then further away from the ends of the rolls (larger gap) than when loaded (smaller gap).

The radius of curvature of the or each gap protector 29 is chosen to respect two constraints:
  when the belt is loaded, it must not be in contact with the gap protector;
  when the belt is empty, the gap between the gap protector and the belt must not allow an operator to slide his fingers between the belt and the gap protector (about 5 mm maximum).

Typically, each slot 39 has a width between one and three millimeters. The space 37 has a width between 10 and 30 millimeters. The width of the space 37 is taken between the open ends of the two slots 39.

The nip angle protector 25 is advantageously formed from a profile.

Thus, the continuous upper edge 33 has the same cross-section along its entire length.

Likewise, the lower portions 35 of each roller guard 27 has the same cross-section over its entire length, this cross-section being taken perpendicular to the axis of the corresponding roller 7.

Due to the design of the nip angle protector 25, the manufacturing method of the support station is particularly simple.

In particular, the method comprises the following steps:
  obtaining a profile with a continuous upper edge and a continuous lower part along its entire length;
  cutting the space 37 and the slots 39 in the profile, by punching the profile in a "T" shape.

The method naturally comprises a step of obtaining the frame 5 and the rollers 7, and a step of assembling the rollers 7 on the frame 5.

After the two above steps, allowing the manufacturing of the nip angle protector 25, the method comprises a step of fixing the nip angle protector 25 on the frame 5. You can specify that the "clipping" and the bending of the protector is done by hand.

The profile has a constant section over its entire length, before punching. It is obtained by any suitable method, for example by extrusion.

The continuous upper edge of the profile directly forms the continuous upper edge 33 of the nip angle protector 25, without the need for further manufacturing operations.

After punching, the continuous lower portion of the profile forms the individual lower portions 35 of the roller guards 27.

The method of manufacturing the support station is thus seen to be particularly simple.

What is claimed is:

1. A support station of a belt conveyor, the support station comprising:
  a frame;
  at least two support rollers adapted to support a conveyor belt running longitudinally from an upstream side of the support rollers to a downstream side of the support rollers, the at least two support rollers being rotatably mounted on the frame about respective axes of rotation substantially perpendicular to the longitudinal direction and being transversely separated by at least one gap, nip angles being formed between the at least two support rollers and the conveyor belt when the conveyor belt rests on the at least two support rollers; and
  a nip angle protector, comprising for each support roller a roller guard placed longitudinally opposite said support roller on an upstream side of said support roller, and, for the or each gap, a gap protector placed longitudinally opposite said gap on an upstream side of said gap,
  wherein the roller guards and the or each gap protector are integral with each other in a single part;
  wherein said single part comprises a continuous upper edge, intended to be placed immediately under the conveyor belt and extending transversely along each support roller and the or each nip,
  wherein said single part comprises, for each roller guard, a lower portion integral with the continuous upper edge and extending the continuous upper edge downwardly, the or each gap guard comprising only the continuous upper edge; and wherein the lower portions of two adjacent roller guards are separated by a space.

2. The support station according to claim 1, wherein the roller guards and the or each gap protector are of a material having an elastic modulus between 50 and 400 MPa.

3. The support station according to claim 1, wherein each two roller guards comprises a slot separating the continuous upper edge from the lower portion and opens into the space.

4. A method of manufacturing a support station according to claim 3, the method comprising the following steps:

obtaining a profile with a continuous upper edge and a continuous lower part along its entire length;

cutting the space and the slots, by T-punching the profile.

5. The support station according to claim 1, wherein the frame comprises at least one fastening bar, at least one of the lower portions comprising a groove form-fittingly attached to the at least one fastening bar.

6. The support station according to claim 1, wherein the at least two support rollers (7) have axes of rotation inclined to each other, the corresponding roller guards being inclined to each other, the gap guard forming a hinge between the roller guards.

7. A belt conveyor comprising a conveyor belt and a plurality of support stations of said conveyor belt according to claim 1, distributed along said conveyor belt.

* * * * *